United States Patent [19]

Leung et al.

[11] Patent Number: 4,619,988

[45] Date of Patent: Oct. 28, 1986

[54] HIGH STRENGTH AND HIGH TENSILE MODULUS FIBERS OR POLY(ETHYLENE OXIDE)

[75] Inventors: Roger Y. Leung, Schaumburg; Anthony J. Polak, Lake Zurich, both of Ill.

[73] Assignee: Allied Corporation, Morristown, N.J.

[21] Appl. No.: 749,073

[22] Filed: Jun. 26, 1985

[51] Int. Cl.$^4$ .............................................. C08G 65/30
[52] U.S. Cl. .................................. 528/421; 264/164; 528/502; 528/503
[58] Field of Search ...................... 528/421, 502, 503; 264/164

[56] References Cited

U.S. PATENT DOCUMENTS

| | | | |
|---|---|---|---|
| 3,509,074 | 4/1970 | Kamio et al. | 528/421 X |
| 3,624,008 | 11/1971 | Damusis | 528/421 X |
| 4,097,652 | 6/1978 | Hartigan | 428/401 |
| 4,413,110 | 11/1983 | Kavesh et al. | 526/348.1 |
| 4,440,711 | 4/1984 | Kwon et al. | 264/185 |

OTHER PUBLICATIONS

European Patent Application Publication No. 0077590.
Colloid and Polymer Science, 256, 729 (1978).

*Primary Examiner*—Earl Nielsen
*Attorney, Agent, or Firm*—Thomas K. McBride; John F. Spears, Jr.; Eugene I. Snyder

[57] ABSTRACT

Strong fibers of poly(ethylene oxide) result from crystallization of the polymer of molecular weight of at least about 500,000 in a shear flow field. Using solutions of a polymer with a molecular weight greater than about 1,000,000, fibers with a tensile strength and tensile modulus of at least 0.1 and 0.5 GPa, respectively, can be readily obtained. Crystallization from a xylene solution within the range from about 35° to about 45° C. is particularly effective.

12 Claims, No Drawings

HIGH STRENGTH AND HIGH TENSILE MODULUS FIBERS OR POLY(ETHYLENE OXIDE)

BACKGROUND OF THE INVENTION

An important development in materials science during the recent past has been the evolution of high performance polymer composites, especially composites with increased strength to weight ratios. One means of obtaining such composites has been the use of fibers as fillers in a polymer matrix to afford fiber-reinforced plastics. In the past the fibers used as a reinforcement have included glass and graphite fiber, and more recently polymer fibers such as polyamide (aramid) fibers have gained increasing use as reinforcing fillers. Still more recently polyethylene and polypropylene fibers have been developed for use in reinforced plastics.

Where used in reinforced plastics, fibers need to have a high tensile strength and a high tensile modulus. When these properties are combined with the lower density of polymer fibers compared with, for example, metals, polymer fibers show a strength to weight ratio perhaps 5-10 times that of metals such as steel and aluminum. Such a weight reduction is important in diverse applications as fabrication of airplane wings, automobile bodies, and golf clubs.

To date high strength polymer fibers have been made mainly from rigid rod polymers. Among the flexible and semiflexible chain polymers, polyethylene, polypropylene and poly(vinyl alcohol) seem to be the only ones from which high strength fibers have beem made to date. In this application we disclose high strength fibers from poly(ethylene oxide), thereby adding to the materials available for use in polymer composites.

The premise underlying the preparation of high strength polymeric fibers is that if long polymer chains in solution can be uncoiled and crystallization induced axially along the linear chains, the resulting filaments will show enhanced tensile strength, ultimately approaching the strength of the weakest bond along the polymer chain. As is usual, the theoretical limits far exceed the reality of practice, and the tensile strength of fibers produced to date are perhaps only 1/10 that theoretically possible, Additionally, however well understood may be the theoretical premise underlying strong fiber production, the practice of obtaining such materials remains unpedictable and subject to constraints not at all well understood. For example, polyethylene filaments can be prepared by spinning a polymer solution, cooling the spun material to a temperature below its gel point, and stretching the resulting filament. Yet the tensile strength is appreciably increased when the polymers have a particular ratio of weight-average to number-average molecular weight. European patent application Publication No. 0077590.

Another method of preparing polyethylene and polypropylene fibers of high tensile strength and tensile modulus involves extrusion of polymer solutions under conditions where the concentration of the polymer in the solution and extrusion are the same, followed by gel formation and stretching of the gel. U.S. Pat. No. 4,413,110. A similar process has been described in U.S. Pat. No. 4,440,711 to make strong poly(vinyl alcohol) fibers.

Crystallization from "stretched" polymer chains may be induced as described by Zwignenburg et al., *Colloid and Polymer Science*, 256, 729 (1978), where a Couette-type apparatus was used to generate shear and extensional flow fields to afford longitudinal growth of polymeric crystals from a flowing solution. In this method shear and extensional fields are induced by a rotating inner cylinder which uncoils the polymer chains in solution in the annular space, and crystal growth is induced by seed formation either at the rotor surface or at some distance beyond. Strong polyethylene fibers previously have been prepared by this method.

SUMMARY OF THE INVENTION

The purpose of our invention is to prepare fibers or filaments of poly(ethylene oxide) with high tensile strength and high tensile modulus. An embodiment is fibers of poly(ethylene oxide) with a tensile strength at least 0.1 GPa and a tensile modulus of at least 0.5 GPa. In another embodiment the fibers are produced by crystallization in shear or extensional flow. In a more specific embodiment the molecular weight of poly(ethylene oxide) is greater than about 1,000,000. Other embodiments will be apparent from the following description.

DESCRIPTION OF THE INVENTION

In one aspect our invention is a poly(ethylene oxide) filament (or fiber) of high tensile strength and high tensile modulus. In another aspect the invention herein is a poly(ethylene oxide) filament obtained by crystallization of a poly(ethylene oxide) of molecular weight greater than about 500,000 in a shear of extensional flow field, the filament being of extraordinarily high tensile strength and tensile modulus relative to previously known filaments of poly(ethylene oxide). Our invention is based on the discovery that a strong fiber of poly-(ethylene oxide) can be produced by flow induced crystallization under appropriate conditions.

The poly(ethylene oxide) fibers of this invention result from a poly(ethylene oxide) of molecular weight greater than about 500,000. It is desirable that the molecular weight be greater than about 1,000,000, and even more preferably greater than about 3,000,000. The polymer should be as free of crosslinking as possible, so that when the chains are uncoiled they approach linearity as closely as possible.

A solution of poly(ethylene oxide) is then induced to crystallize axially in a shear or extensional flow field. The specifics of the nature of the solution and the temperature at which crystallization is induced is essential to the success of this invention. If the polymer is too soluble in the solvent, the crystal will tend to dissolve as it is formed. On the other hand, if the polymer is insufficiently soluble in the solvent the crystal will tend to precipitate in a lamellar state. For the fibers under discussion here xylene is an excellent compromise as a solvent. Other common solvents, especially polar solvents such as water, the lower alkanols ($C_1$–$C_3$), and glycols, have been found to be unsatisfactory. Xylene may not be unique to the success of this invention, and other semipolar solvents generally may be used although not necessarily with equivalent results. Thus other aromatics, such as toluene, ethylbenzene, and alkylated aromatics generally, may be employed under suitable conditions, as may be solvents such as the dialkyl ethers of ethylene glycol and higher alkylene glycols, as for example, dimethyl cellosolve, dibutyl cellosolve, diglyme (dimethyl ether of diethylene glycol), and so forth. Solutions generally contain poly(ethylene oxide) at a concentration less than about 5%, the particular value varying somewhat with solvent. Ideally, solvents will be such that the solubility of the polymer at the temperature at which crystallization is induced is between about 0.1 and about 1.0 weight percent. In the case of xylene a concentration from about 0.2 to about 1% by weight has been found to be particularly advantageous in the practice of this invention.

Just as the success of our invention is dependent upon choosing an appropriate solvent, so is the success dependent upon crystallization within a narrow temperature range. Generally, the crystallinity of the resulting fiber, hence its strength, increases with increasing temperature. However, at too high a temperature the crystalline polymer tends to melt or redissolve in the solvent. It is necessary to work at a temperature less than 65° C., for this is the melting point of poly(ethylene oxide). The optimum temperature range generally is quite narrow and may vary somewhat with solvent. In the case of xylene the optimum range for crystallization is between about 35° and about 45° C.

Flow induced crystallization of poly(ethylene oxide) in a dilute xylene solution at a temperature between about 35° and about 45° C. may be effected by a Couette viscometer. The crystal may be grown at the rotor surface, which leads to the fastest crystal growth, or it may be grown in the annular space between the rotor and the outer wall, which perhaps leads to more perfect crystals. The filament as grown may be wound up on a spool at its growth rate, thereby leading to a continuous filament of poly(ethylene oxide).

The poly(ethylene oxide) filaments of this invention have a tensile strength of at least 0.1 GPa, and preferably of at least 0.2 GPa. Such fibers also have a tensile modulus of at least 0.5 GPa, more preferably at least 1.0 GPa, and even more preferably greater than 1 GPa. The ultimate modulus of the ethylene oxide bonds is about 10 GPa (L. Holliday and J. W. White, *Pure and Applied Chem.*, 26, 545 (1971)) which is the theoretical limit of the tensile modulus of poly(ethylene oxide) fibers.

The following merely illustrates our invention which is not to be limited to the examples cited below.

EXAMPLE

The Couette viscometer used was similar in design to that of Zwijnenburg and Pennings, *Colloid and Polymer Sci.*, 254, 868 (1976) with an outer glass cylinder 10 cm in diameter and an inner glass rotor 9 cm in diameter. A side arm tube facilitated removal of the fiber as it was formed. In the fiber growth experiments, the entire apparatus was immersed in an oil bath whose temperature was controlled within 0.5° C. Rotor speeds varied from 30 to 120 rpm and the most frequently used speed was 60 rpm.

Fiber growth was initiated with a seed which was either a piece of cotton or fiber made in a previous experiment. In the surface growth method the seed was allowed to touch the rotor surface to enhance the growth rate. Growing fibers were pulled out from the side arm tube of the outer cylinder in a direction opposite to that of the elongational flow field. The glass rotor was silanized in a 3:1 hexamethyldisiloxane and triethoxymethylsilane solution of hexane to obtain a surface more attractive for the adsorption of polymer molecules.

Poly(ethylene oxide) fibers were produced in the Couette viscometer from an approximately 0.5% xylene solution at temperatures between about 35° and about 45° C. Fiber structures of the samples were observed using scanning electron microscopy. Tensile modulus and tensile strength of the fibers at room temperature were measured using an instron tester at a strain rate of $3 \times 10^{-3}$/sec.

Using a poly(ethylene oxide) of molecular weight approximately $5 \times 10^6$ the resulting fibers had a tensile modulus in the range of 0.5–1 GPa with a breaking stress of about 0.2 GPa. The fibers could be stretched to 30–70% of their original length at breakage. For comparison, the tensile modulus and strength of typical commercial poly(ethylene oxide) materials are 0.3 GPa and 0.06 GPa, respectively.

When observed under the electron microscope the fibers exhibited the typical "shish-kebab" structure but with large amounts of chain-folded overgrowth lamellae. The spacing between the "kekab" component of the same elementary fiber is about 3000 Angstroms. The overgrowth layer was so wide that they started to form bridges between neighboring elementary fibrils and to smear the detailed structure of the central micro "shish-kebab" such that some of the "shish-kebabs" appeared as a straight column. Even though the "shish-kebabs" showed good alignment along the fiber direction, considerable amount of gel materials and overgrowth components with dwindling of the elementary fibrils were observed in some cases. To a large extent, these imperfections reduced the mechanical strength of the poly(ethylene oxide) fibers, hence it is desirable to form the fiber under conditions leading to minimum imperfections.

What is claimed is:

1. A method of making a poly(ethylene oxide) filament with a tensile strength of at least 0.1 GPa and a tensile modulus of at least 0.5 GPa comprising crystallizing poly(ethylene oxide) from a solution containing less than about 5 weight percent of poly(ethylene oxide) of molecular weight greater than about $10^6$ in a shear or extensional flow field of the type produced by a Couette viscometer at a temperature from about 35° to about 45° C.

2. The method of claim 1 where the molecular weight is at least about $3 \times 10^6$.

3. The method of claim 2 where the molecular weight is at least $5 \times 10^6$.

4. The method of claim 1 where the molecular weight is between about $1-5 \times 10^6$.

5. The method of claim 6 where the solution contains from about 0.1 to about 1.0 weight percent of poly(ethylene oxide).

6. The method of claim 4 where the solution contains from about 0.1 to about 1.0 weight percent of poly(ethylene oxide).

7. A filament of poly(ethylene oxide) with a tensile strength of at least 0.1 GPa and a tensile modulus of at least 0.5 GPa produced by crystallizing poly(ethylene oxide) from a solution containing less than about 5% of poly(ethylene oxide) of molecular weight greater than about $10^6$ in a shear of extensional flow field of the type produced by a Couette viscometer at a temperature between about 35° and about 45° C.

8. The filament of claim 7 where the molecular weight is at least about $3 \times 10^6$.

9. The filament of claim 4 where the molecular weight is at least about $5 \times 10^6$.

10. The filament of claim 7 where the molecular weight is between about $1-5 \times 10^6$.

11. The filament of claim 7 where the solution contains from about 0.1 to about 1.0 weight percent of poly(ethylene oxide).

12. The filament of claim 10 where the solution contains from about 0.1 to about 1.0 weight percent of poly(ethylene oxide).

* * * * *